United States Patent
Ling et al.

(10) Patent No.: US 10,768,633 B2
(45) Date of Patent: Sep. 8, 2020

(54) HITCH ASSIST SYSTEM

(71) Applicant: Ford Global Technologies, LLC, Dearborn, MI (US)

(72) Inventors: Yu Ling, Canton, MI (US); Chen Zhang, San Jose, CA (US); Luke Niewiadomski, Hamtramck, MI (US); Theresa Lin, Berkeley, CA (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 16/035,853

(22) Filed: Jul. 16, 2018

(65) Prior Publication Data
US 2020/0019182 A1 Jan. 16, 2020

(51) Int. Cl.
*G05D 1/02* (2020.01)
*B60R 1/00* (2006.01)
*B60D 1/36* (2006.01)

(52) U.S. Cl.
CPC ............. *G05D 1/0246* (2013.01); *B60R 1/00* (2013.01); *B60D 1/36* (2013.01); *B60R 2300/105* (2013.01); *B60R 2300/20* (2013.01); *B60R 2300/304* (2013.01); *B60R 2300/808* (2013.01); *G05D 2201/0213* (2013.01)

(58) Field of Classification Search
CPC .......... G05D 1/0246; G05D 2201/0213; B60R 1/00; B60R 2300/105; B60R 2300/20; B60R 2300/808; B60R 2300/304; B60D 1/36
See application file for complete search history.

(56) References Cited

U.S. PATENT DOCUMENTS

| | | | |
|---|---|---|---|
| 9,102,271 B2 | 8/2015 | Trombley et al. | |
| 9,264,672 B2 | 2/2016 | Lynam | |
| 9,499,018 B2 | 11/2016 | Gehrke et al. | |
| 9,696,723 B2 | 7/2017 | Zeng et al. | |
| 9,854,209 B2 | 12/2017 | Aich et al. | |
| 9,889,714 B2 | 2/2018 | Bochenek et al. | |
| 2010/0265048 A1* | 10/2010 | Lu ........................ | B60Q 9/005 340/435 |
| 2010/0324770 A1 | 12/2010 | Ramsey et al. | |
| 2012/0283909 A1 | 11/2012 | Dix | |
| 2013/0106993 A1* | 5/2013 | Schofield ............... | B60N 2/002 348/36 |
| 2015/0081174 A1* | 3/2015 | Marczok ................ | B60Q 9/005 701/41 |
| 2015/0115571 A1 | 4/2015 | Zhang | |
| 2016/0375831 A1* | 12/2016 | Wang ...................... | G06F 3/048 348/148 |

(Continued)

FOREIGN PATENT DOCUMENTS

EP 2682329 A1 1/2014

*Primary Examiner* — Rodney A Butler
(74) *Attorney, Agent, or Firm* — Raymond Coppiellie; Price Heneveld LLP

(57) ABSTRACT

A hitch assist system is provided herein. The hitch assist system includes a sensing system configured to detect a hitch assembly and a coupler. A controller is configured to generate commands for maneuvering a vehicle along a first path or a second path. A user input device includes a display, the display configured to illustrate the first and second paths.

18 Claims, 14 Drawing Sheets

(56) References Cited

U.S. PATENT DOCUMENTS

| | | | | |
|---|---|---|---|---|
| 2018/0029429 A1* | 2/2018 | Janardhana | ............. | B60D 1/36 |
| 2018/0215382 A1* | 8/2018 | Gupta | ................... | G08G 1/166 |
| 2019/0241126 A1* | 8/2019 | Murad | ...................... | B60R 1/12 |

* cited by examiner

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes a sensing system configured to detect a hitch assembly and a coupler. A controller is configured to generate commands for maneuvering a vehicle along a first path or a second path. A user input device includes a display. The display is configured to illustrate the first and second paths.

According to some aspects of the present disclosure, a hitch assist method is provided herein. The method includes determining an offset of a hitch ball relative to said coupler. The method also includes calculating a first path to align the hitch ball to said coupler, the first path having a positioning path and an alignment path. The method further includes maneuvering a vehicle a predefined distance along the positioning path at a first vehicle speed-setpoint. Lastly, the method includes aligning the hitch ball to said coupler along the alignment path at a second vehicle speed-setpoint, the second speed-setpoint less than the first vehicle speed-setpoint.

According to some aspects of the present disclosure, a hitch assist system is provided herein. The hitch assist system includes an imager for capturing one or more images of a hitch assembly and a coupler. A display generates an image patch based on the one or more images. A controller is configured to identify the hitch assembly, identify a coupler, and display an overlaid vehicle occupation zone on the display that extends through the hitch assembly, the vehicle occupation zone defining an area in which a vehicle travels to align the hitch assembly with the coupler.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
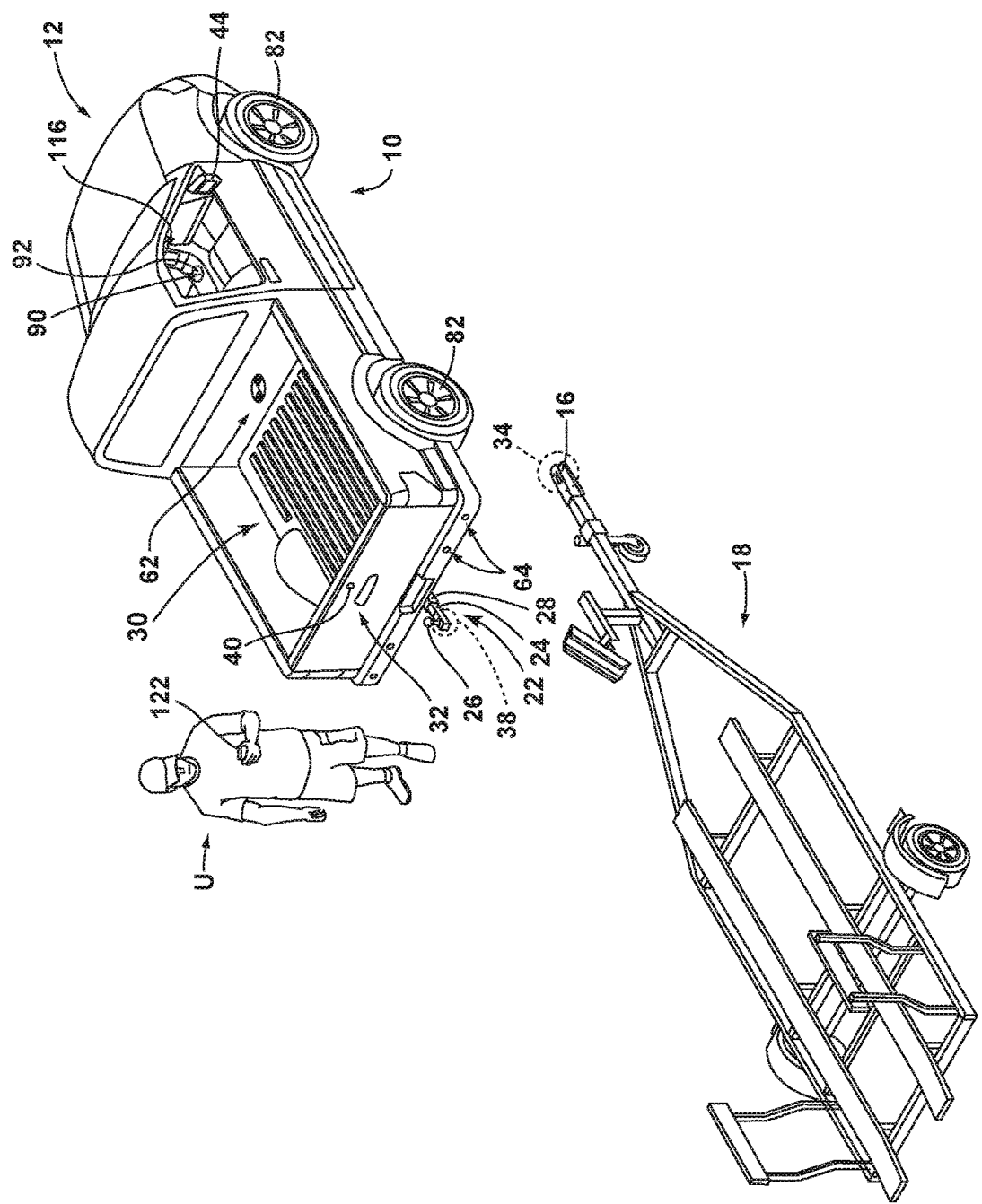
FIG. 1 is a top perspective view of a vehicle and a trailer, the vehicle being equipped with a hitch assist system, according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a hitch assist system for a vehicle. The hitch assist system may include a sensing system configured to detect a hitch assembly and/or a coupler of a trailer through one or more imagers and/or sensors. The hitch assist system further includes a controller configured to generate commands for maneuvering the vehicle along a positioning path and a subsequent alignment path, if desired and/or needed. The positioning path locates the hitch assembly proximate the coupler of the trailer. The alignment path may have one or more sequential corrections such that the hitch assembly is aligned with the coupler upon completion of the alignment path. The vehicle may move at a first speed-setpoint during the positioning path and a second speed-setpoint during the alignment path. The controller may further generate a vehicle occupation zone that illustrates an area through which the vehicle may move to align the hitch assembly with the coupler. Additionally, the controller may generate multiple paths that may align the hitch assembly with the coupler. A user may select a desired path from the plurality of generated paths.

Figure 2:
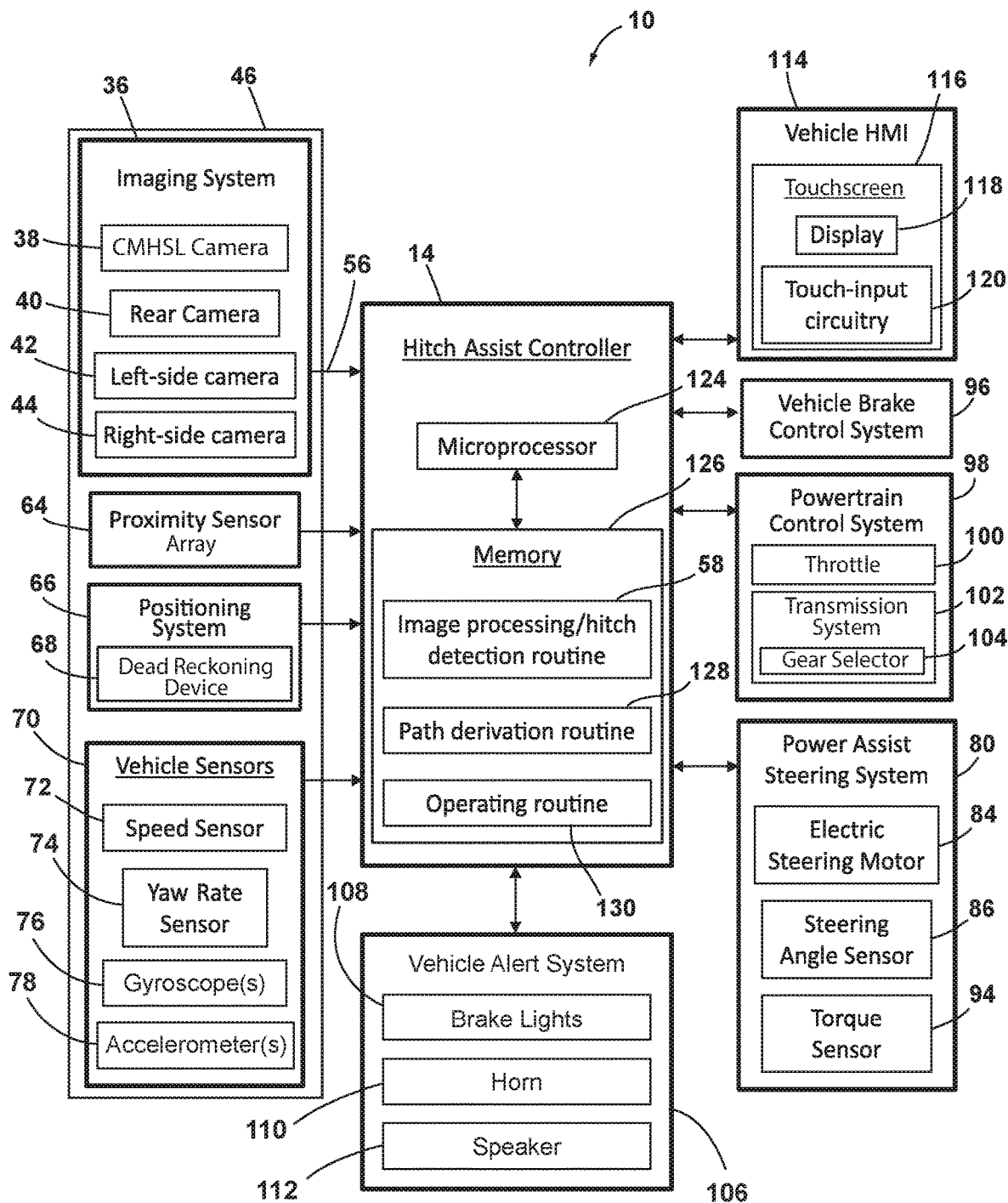
FIG. 2 is a block diagram illustrating various components of the hitch assist system, according to some examples.

Referring to FIGS. 1 and 2, reference numeral 10 designates a hitch assistance system (also referred to as a "hitch assist" system) for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. The ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a coupler 16 in the form of a coupler ball socket 34 that is provided at a terminal end portion of the coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a box trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 50, 52a, 52b, FIG. 3) defined by the image-capturing optics. In some instances, the one or more imagers 38, 40, 42, 44 may derive an image patch 54 (FIG. 13) from multiple image frames that may be shown on a display 118 as a combination of the actual image frames and/or a generated image based on the image frames. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 defaults to utilization of the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image processing routine 58, or in another dedicated image processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

Figure 3:
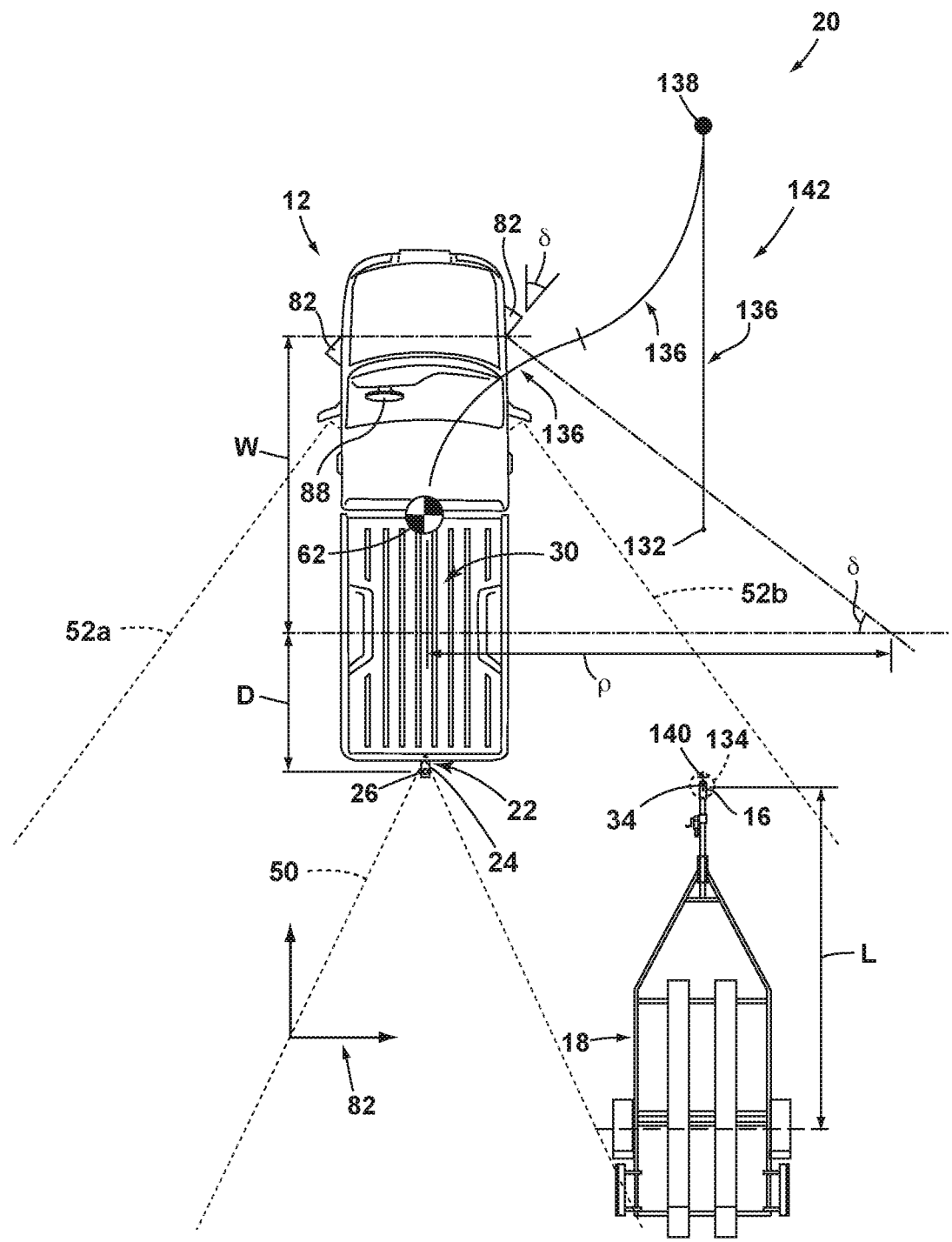
FIG. 3 is an overhead schematic view of the vehicle during a step of the alignment sequence with the trailer, according to some examples.
Figure 4:
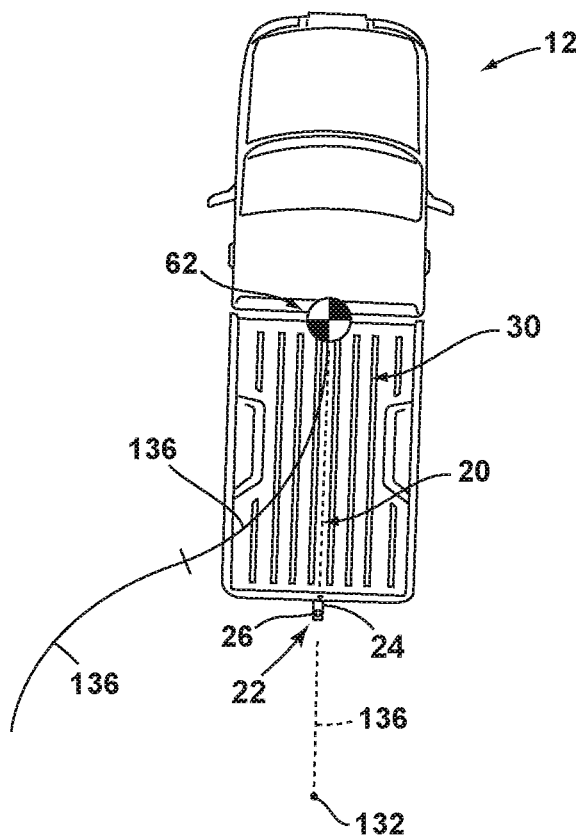
FIG. 4 is an overhead schematic view of the vehicle during a subsequent step of the alignment sequence with the trailer, according to some examples.
Figure 4:
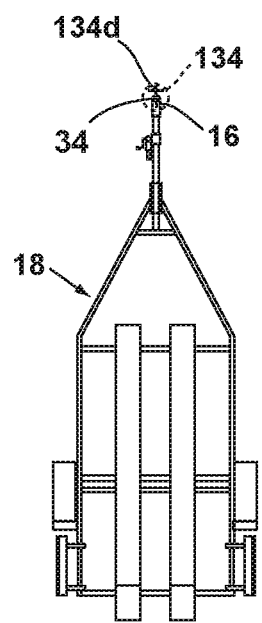

With reference to FIG. 3, in some instances, the trailer 18 may be laterally offset from the vehicle 12 and outside of the field of view 50 of the rear imager 40. In such instances, if the trailer 18 is disposed within the field of view 52a, 52b of any other imager 38, 42, 44, the hitch assist system 10 may detect the trailer 18 through use of the alternative imagers 38, 42, 44. In some examples, if the trailer 18 is not within the field of view 50 of the rear imager 40, the user U may select the trailer 18 from an alternative imager 38, 42, 44 disposed on the vehicle 12. In some instances, a user interface, such as a touchscreen 116 may be used to select a field of view 48, 50, 52a, 52b from the one or more imagers 38, 40, 42, 44 that correlates to an area surrounding the vehicle 12. From that field of view 48, 50, 52a, 52b, the user U may select the trailer 18 that they wish to align the hitch assembly 22 therewith.

In some examples, the use of two images including the same object can be used to determine a location of the object relative to the two imagers 38, 40, 42, and/or 44, given a known spatial relationship between the imagers 38, 40, 42, and/or 44 through projective geometry of the imagers 38, 40, 42, and/or 44. In this respect, the image processing routine 58 can use known programming and/or functionality to identify an object within the image data 56 from the various imagers 38, 40, 42, 44 within the imaging system 36. The image processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, or other features of the vehicle 12, such as the hitch ball 26 (FIG. 1), with known positions relative to the center 62 of the vehicle 12. Moreover, as the vehicle 12 is moved along the path 20, the coupler 16 may enter and/or exit the field of view 48, 50, 52a, 52b of one or more of the imagers 38, 40, 42, 44. In such instances, the path 20 may have been already calculated such that a smooth transition between various fields of view 48, 50, 52a, 52b may monitor the coupler 16 as the vehicle 12 approaches the coupler 16. As the hitch assembly 22 approaches the coupler 16, any imager 38, 40, 42, 44 having a field of view 48, 50, 52a, 52b that includes the coupler 16 therein may be used to monitor the coupler 16.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (RADAR) sensor, a sound navigation and ranging (SONAR) sensor, a light detection and ranging (LIDAR) sensor, a vision-based sensor, and/or any other type of sensor known in the art.

Referring still to FIGS. 1 and 2, a positioning system 66, which may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle δ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle δ based on a steering command generated by the controller 14, whereby the steering angle δ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque, thereby preventing manual intervention with the steering wheel 88 during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of a vehicle transmission. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle alert system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle alert system 106 may communicate with a human-machine interface (HMI) 114 of the vehicle 12. The HMI 114 may include a touchscreen 116 such as a navigation and/or entertainment display 118 mounted within a cockpit module, an instrument cluster, and/or any other location within the vehicle 12, which may be capable of displaying images 54 (FIG. 5), indicating the alert.

In some instances, the HMI 114 further includes a user-input device, which can be implemented by configuring the display 118 as a portion of the touchscreen 116 with circuitry 120 to receive an input corresponding with a location over the display 118. Other forms of input, including one or more joysticks, digital input pads, or the like can be used in place of or in addition to touchscreen 116.

Further, the hitch assist system 10 may communicate via wired and/or wireless communication with some instances of the HMI 114 and/or with one or more handheld or portable devices 122 (FIG. 1). The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image processing/hitch detection routine 58, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image processing routine 58 may be carried out by a dedicated processor, for example, within a stand-alone imaging system 36 for the vehicle 12 that can output the results of its image processing to other components and systems of vehicle 12, including the microprocessor 124. Further, any system, computer, processor, or the like that completes image processing functionality, such as that described herein, may be referred to herein as an "image processor" regardless of other functionality it may also implement (including simultaneously with executing the image processing routine 58).

In some examples, the image processing routine 58 can be programmed or otherwise configured to locate the coupler 16 within the image data 56. In some instances, the image processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly assigned U.S. Pat. No. 9,102,271, entitled "TRAILER MONITORING SYSTEM AND METHOD," the entire disclosure of which is incorporated by reference herein. In such examples, the image processing routine 58 may be programmed with identifying characteristics of the marker for location in the image data 56, as well as the positioning of the coupler 16 relative to such a marker so that the location of the coupler 16 can be determined based on the marker location. Additionally or alternatively, the controller 14 may seek confirmation that the recognized coupler 16 is the one desired by the user U, via a prompt on the touchscreen 116 and/or the portable device 122. If the coupler 16 determination is not confirmed, further image processing may be provided, or user-adjustment of the position 134 of the coupler 16 may be facilitated, either using the touchscreen 116 or another input to allow the user to move the depicted position 134 of the coupler 16 on the touchscreen 116, which the controller 14 uses to adjust the determination of the position 134 of the coupler 16 with respect to the vehicle 12 based on the above-described use of the image data 56. Alternatively, the user can visually determine the position 134 of the coupler 16 within an image presented on HMI 114 and can provide a touch input in a manner similar to that which is described in co-pending, commonly-assigned U.S. patent application Ser. No. 15/583, 014, filed May 1, 2017, and entitled "SYSTEM TO AUTOMATE HITCHING A TRAILER," the entire disclosure of which is incorporated by reference herein.

Figure 7:
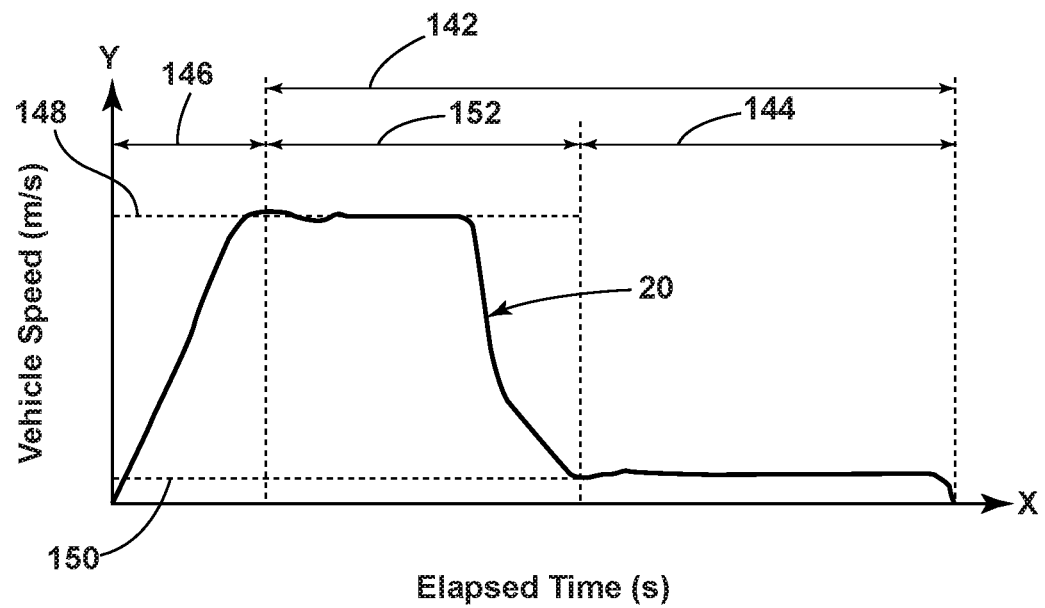
FIG. 7 is an exemplary graph illustrating a time versus vehicle speed during the maneuvering of the vehicle along a positioning path and an alignment path to align the hitch assembly with the coupler, according to some examples.
Figure 8:
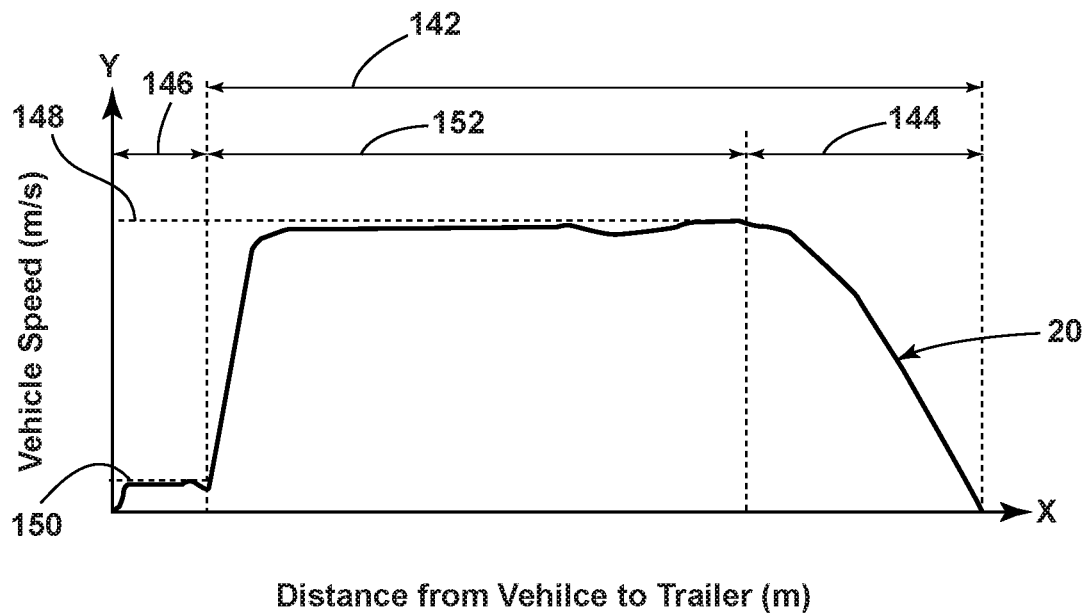
FIG. 8 is an exemplary graph illustrating a distance between the vehicle and the trailer versus vehicle speed during the maneuvering of the vehicle along the positioning path and the alignment path to align the hitch assembly with the coupler, according to some examples.

As shown in FIGS. 3-6, in some exemplary instances of the hitch assist system 10, the image processing routine 58 and operating routine 130 may be used in conjunction with each other to determine the path 20 along which the hitch assist system 10 can guide the vehicle 12 to align the hitch ball 26 and the coupler 16 of the trailer 18. As provided in more detail below, the path 20 may include a positioning path 142 and an alignment path 144 (FIGS. 7 and 8). Accordingly, the positioning path 142 may terminate at an initial endpoint 132 and the alignment path 144 may terminate at a final endpoint 140. In some circumstances, the initial and final endpoints 132, 140 may be the same location.

In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis 174 (FIG. 13) of the vehicle 12. Once the positioning $D_c$, $\alpha_c$ of the coupler 16 has been determined and, optionally, confirmed by the user, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance D from the rear axle to the hitch ball 26, which is referred to herein as the drawbar length, as well as a maximum angle to which the steered wheels 82 can be turned $\delta_{max}$. As shown, the wheelbase W and the current steering angle δ can be used to determine a corresponding turning radius ρ for the vehicle 12 according to the equation:

$$\rho = \frac{1}{W \tan \delta}, \quad (1)$$

in which the wheelbase W is fixed and the steering angle δ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \quad (2)$$

The path derivation routine 128 can be programmed to derive the vehicle path 20 to align a known location of the vehicle hitch ball 26 with the estimated position 134 of the coupler 16 that takes into account the determined minimum turning radius $\mu_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the desired path 20, including the initial endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle δ, as dictated by the path 20, depending on the position of the vehicle 12 therealong. It is additionally noted that in some examples, the path 20 may comprise a progression of steering angle δ adjustments that are dependent on the tracked vehicle position. Moreover, in some instances, each correction may include a single steering angle δ adjustment during that correction.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path 20 in which a vehicle condition is changed. The vehicle conditions include, but are not limited to, a change in speed, a change in steering angle δ, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight, rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, a single inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle $\delta$ less than the maximum steering angle $\delta_{max}$, followed by an inflection point 138 and a rearward driving segment 136 at a maximum leftward steering angle $\delta_{max}$ with a shorter straight backing segment 136, with still further paths 20 being possible.

In some instances, the hitch assist system 10 may be configured to operate with the vehicle 12 in reverse only, in which case the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $\alpha_c$, or the like. It is further noted that the estimates for the positioning $D_c$, $\alpha_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
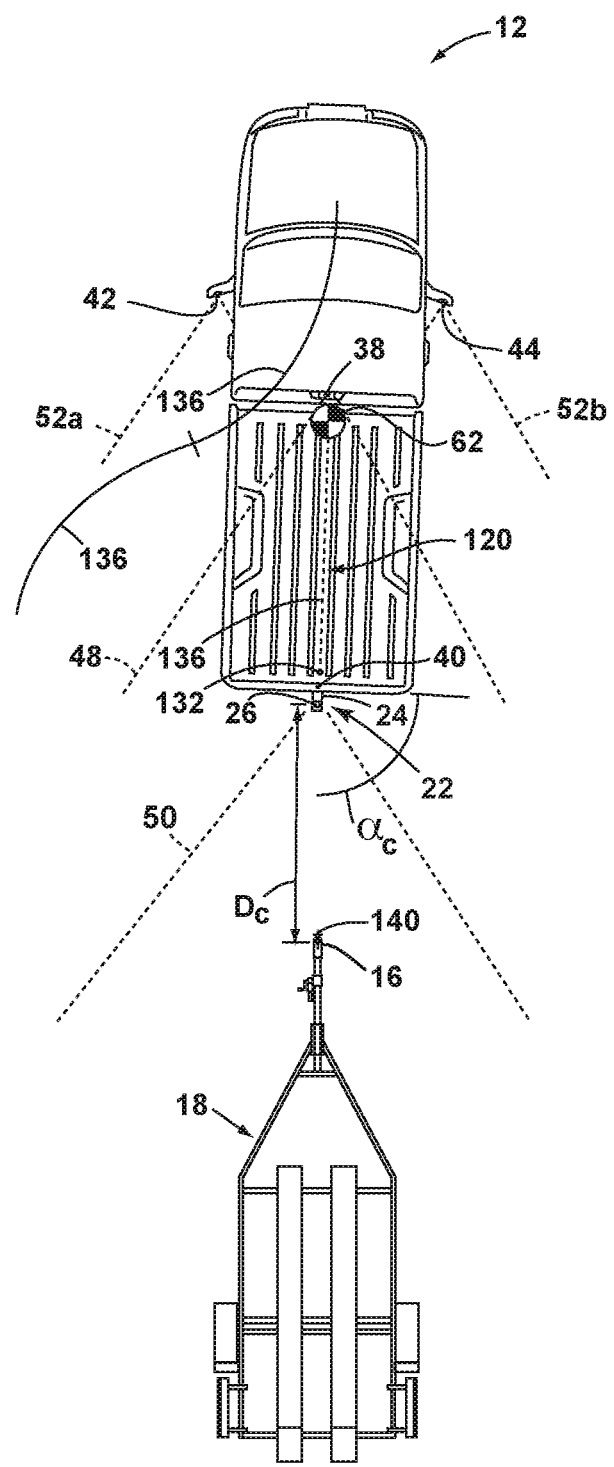
FIG. 5 is an overhead schematic view of the vehicle during a subsequent step of the alignment sequence with the trailer, according to some examples.
Figure 6:
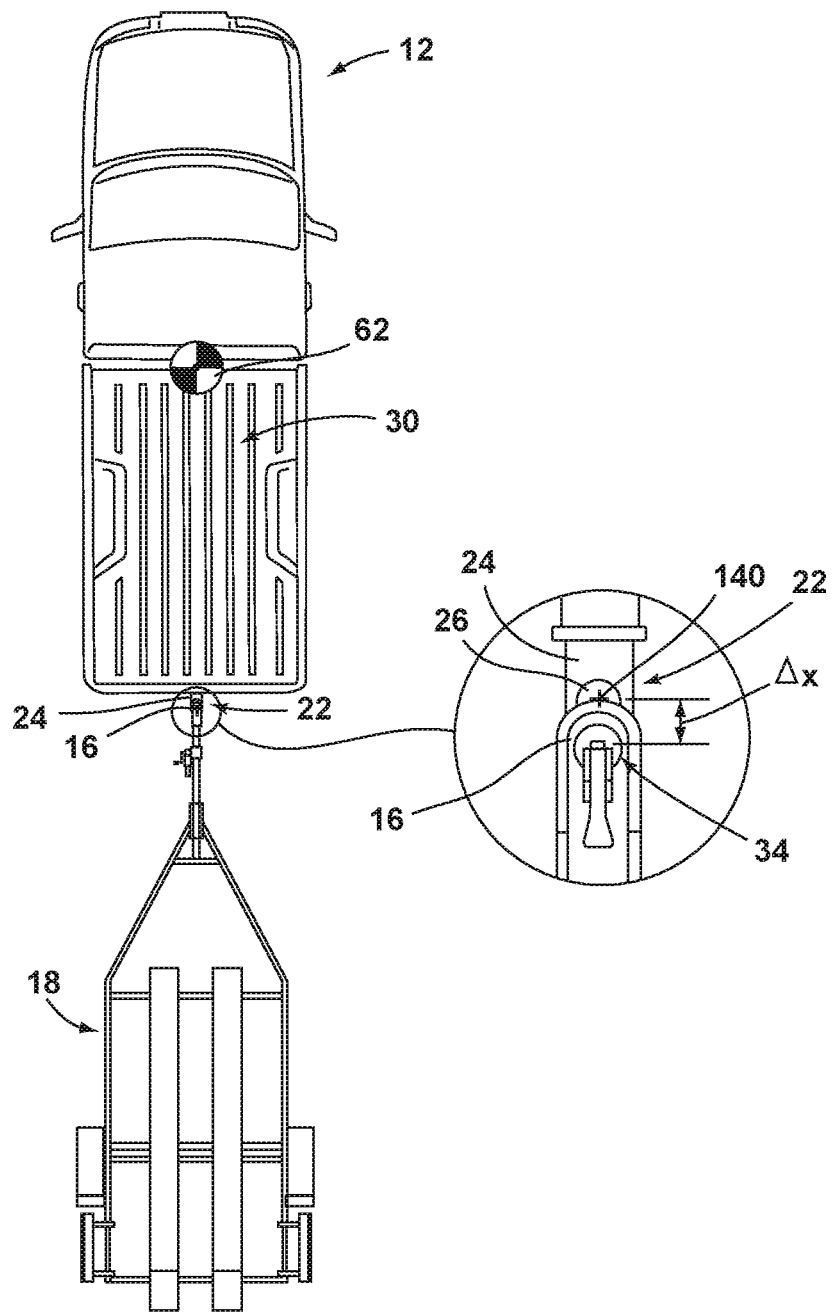
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 given the vertical component of the position 134 of the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height of the coupler 16 and the height of the hitch ball 26, which represents the vertical distance by which coupler 16 will be lowered to engage with hitch ball 26. The determined trajectory is then used to relate the vertical distance with a corresponding horizontal distance $\Delta x$ of coupler 16 movement in the driving direction that results from the vertical distance. This horizontal distance $\Delta x$ can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3. As provided herein, once the projected initial endpoint 132 has been reached, or the vehicle 12 is proximate to the initial endpoint 132, the positioning path 142 (FIG. 3) may be complete. If the initial endpoint 132 is offset from the final endpoint 140, the alignment path 144 may begin and move the vehicle 12 to the final endpoint 140.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image processing routine 58 monitors the positioning $D_c$, $\alpha_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and or the initial endpoint 132 can be refined or should be updated (due to, for example, improved coupler height $H_c$, distance $D_c$, or offset angle $\alpha_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $\delta_{max}$, while tracking the position $D_c$, $\alpha_c$ of the coupler 16 to converge the known relative position of the hitch ball 26 to the desired final endpoint 140 thereof relative to the tracked position 134 of the coupler 16.

Referring to FIGS. 7-15, as provided herein, the vehicle path 20 may include a positioning path 142 and a subsequent alignment path 144. The positioning path 142 may locate the vehicle 12 proximate the initial endpoint 132, which may be a predefined offset vehicle forwardly of the coupler 16 to mitigate misalignment issues due to potential error from a wide range of variants. For example, various conditions of the brake system, various types of road surfaces, variances in vehicle weight, various tire designs, a level of wear of the tires, a gradient of the terrain, software latency, network interference, etc. may affect the precision of the vehicle 12 to reach the initial endpoint 132. Additionally, because a wide range of variants may lead to the vehicle 12 backing past the initial endpoint 132, the offset may assist in preventing unwanted conditions such as overshooting the coupler 16 and possibly leading to contact between the trailer 18 and the vehicle 12. To increase the precision of the hitch assembly 22 in relation to the coupler 16, the alignment path 144 may be performed at a speed that is less than the speed during the positioning path 142. The vehicle 12 may operate at the reduced speed until the final endpoint 140 is reached. It will be appreciated that in some circumstances the alignment path 144 may not be needed. For example, when the alignment path 144 would move the vehicle 12 to a location further from the final endpoint 140 than the current position of the vehicle 12 at the initial endpoint 132, the alignment path 144 may not be performed.

With further reference to FIGS. 7 and 8, once the vehicle path 20 is determined, the vehicle 12 may move along the positioning path 142. The vehicle 12 may accelerate during a first portion 146 of the positioning path 142 from a standstill, or low speed, to a first speed-setpoint 148. A feedback measurement of the actual vehicle speed (i.e., wheel rotations/time) may be used in a control loop to prevent excessive overshoot or undershoot of the first speed-setpoint 148. The acceleration during the first portion 146 of the positioning path 142 may be designed to match a normal human-operated control of the vehicle's acceleration. Accordingly, the movement of the vehicle 12 may be comfortable to the user U. Thus, in some instances, the acceleration of the vehicle 12 may be limited to a maximum acceleration value and may be performed with a smooth (or substantially linear) rate of acceleration, which may assist in preventing vehicle jolt.

Once the vehicle 12 approaches the first speed-setpoint 148, the vehicle 12 may continue along the positioning path 142 at a speed proximate the first speed-setpoint 148. The vehicle 12 may maneuver at the first speed-setpoint 148 to expedite the positioning of the vehicle 12 proximate the initial endpoint 132, and/or the coupler 16, but slow enough to allow precise vehicle control, accurate sensor measurements, and tracking, and comfort to the user U. As provided herein, once the vehicle 12 is approaching the initial endpoint 132, the vehicle 12 decelerates to a speed that is equal to or less than a second speed-setpoint 150.

The alignment path 144 may occur at the second speed-setpoint 150. The second speed-setpoint 150 may be a steady, substantially constant, lower speed relative to the first speed-setpoint 148. In some circumstances, the second speed-setpoint 150 may be proximate the slowest continuous speed the vehicle 12 is capable of robustly achieving. The lower second speed-setpoint 150 compared to the first speed-setpoint 148 may assist in a more accurate alignment between the hitch assembly 22 and the coupler 16 as the variances/tolerances of the vehicle systems may be further mitigated and the vehicle sensors 64, 70 may be able to provide additional accuracy of the location of the coupler 16 due to the slower second speed-setpoint 150. Further, due to the low vehicle speed, the precision of the positioning of the hitch assembly 22 relative to the coupler 16 may be increased. The slower second speed-setpoint 150 minimizes the possibility of error, or error stack up, during the alignment path 144.

As the vehicle 12 approaches the final endpoint 140, the braking system brings the vehicle 12 to a stop. The stopping, or deceleration portion 152, of the alignment path 144 may be a known average from calibration testing and stored within the memory 126 of the controller 14. It will be appreciated that the deceleration portion 152 of the alignment path 144 may be altered over time due to variances in environmental factors and/or changes in vehicle component conditions. This variation may be minimized due to the slower second speed-setpoint 150 and may also be predicted and adapted to using feedforward data acquired during the positioning path 142 and alignment path 144 operations. For example, if the deceleration portion 152 of the positioning path 142 takes longer than calculated/predicted by the controller 14, the hitch assist system 10 may deem that the deceleration portion 152 of the alignment path 144 will also be longer than originally calculated. Accordingly, the positioning path 142 and the alignment path 144 may each include a deceleration period and wherein the alignment path deceleration period is based on a comparison of a detected deceleration period compared to an estimated deceleration period.

In some examples, the hitch assist system 10 may be initiated when the vehicle starting point is already proximate the vehicle 12. In these cases, the hitch assist system 10 may estimate the distance traveled during the acceleration portion of the positioning path 142. The deceleration portion 152 of the positioning path 142 may also be known. If the sum of the acceleration portion and the deceleration portion 152 is greater than or proximate to the measured distance to the coupler 16, then the hitch assist system 10 may skip the positioning path 142 and operate in the alignment path 144.

It will be appreciated that through the positioning path 142 and the alignment path 144, the lateral acceleration/deceleration may be controlled using a feedback controller 14 that controls vehicle speed and may help with smooth transitions between threshold speed-setpoints. In this way, sharp turns may be executed to align the hitch assembly 22 and the coupler 16 in a manner that is both comfortable to the driver and allows the steering system to provided steering wheel motion.

Figure 9:
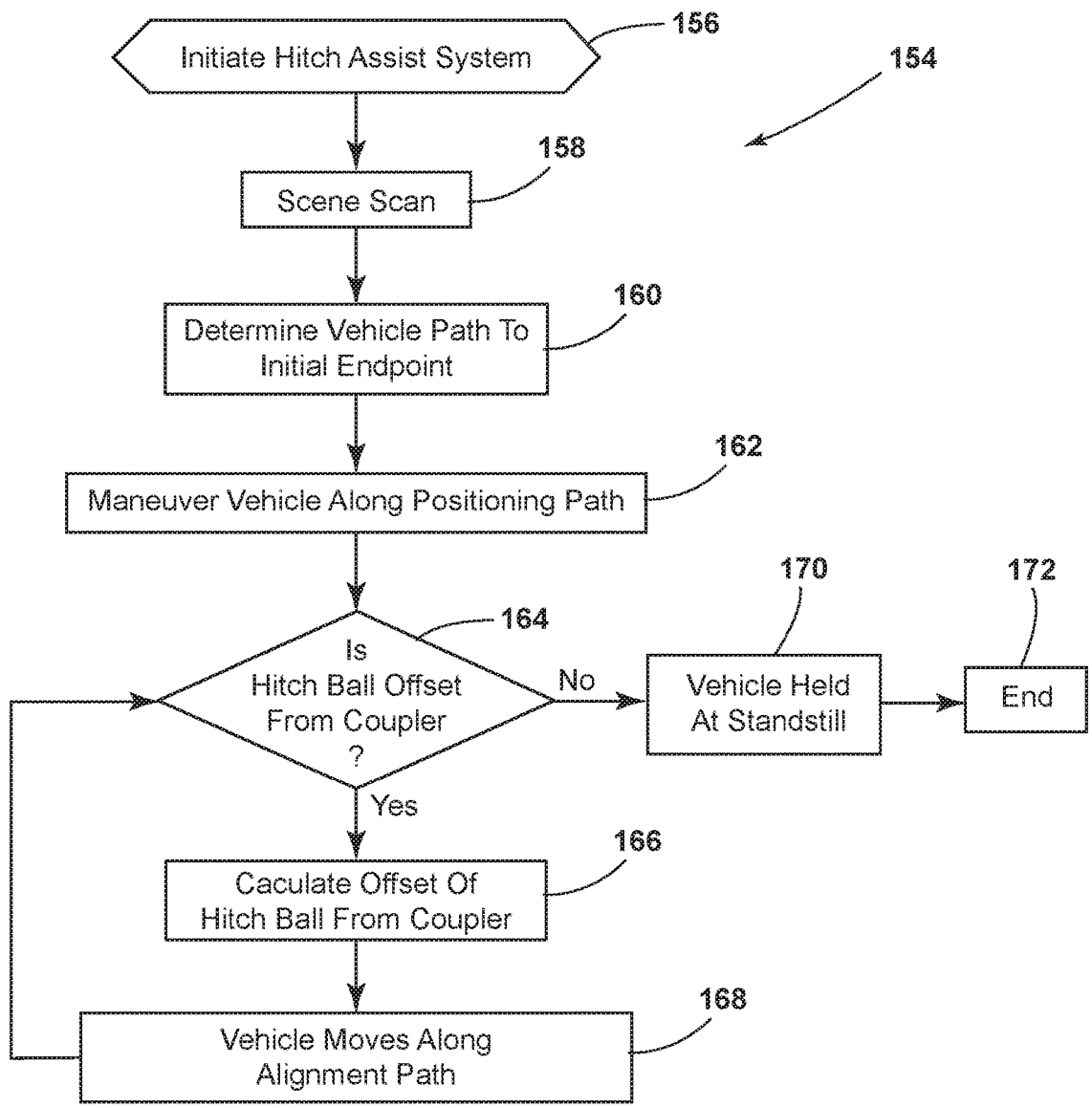
FIG. 9 is a flowchart illustrating the steps of aligning the hitch ball to the coupler including a positioning path and an alignment path, according to some examples.

With reference to FIG. 9, a method 154 of aligning the hitch assembly 22 with the coupler 16 is shown. In particular, in step 156, the hitch assist system 10 is initiated. In some examples, the hitch assist system 10 can be initiated at any point when the coupler 16 is in the field of view 48, 50, 52a, 52b of at least one imager 38, 40, 42, 44 within imaging system 36. Accordingly, once the hitch assist system 10 is initiated, the controller 14 can use imaging system 36 to scan the viewable scene using any or all available imagers 38, 40, 42, 44 at step 158. The scene scan can create the image patch 54 (FIG. 3) that may be used to then identify the coupler 16 and, optionally, the associated trailer 18. At step 160, the hitch assist system 10 determines an initial endpoint 132 of the vehicle path 20 that places the hitch ball 26 and the coupler 16 proximate one another.

At step 162, the controller 14 uses the path derivation routine 128 to determine the path 20 to align the vehicle 12 with the initial endpoint 132. Once the path 20 has been derived, the hitch assist system 10 can ask the user U to relinquish control of at least the steering wheel 88 of vehicle 12 (and, optionally, the throttle 100 and brake control system 96, in various implementations of the hitch assist system 10 wherein the controller 14 assumes control of the powertrain control system 98 and the brake control system 96 during execution of the operating routine 130) while the vehicle 12 is maneuvered along the positioning path 142 (FIG. 3), which may be performed at a speed equal to the first speed-setpoint 148 for at least a portion thereof. When it has been confirmed that user U is not attempting to control the steering system 80 (for example, using the torque sensor 94), the controller 14 moves the vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the speed of vehicle 12 using the powertrain control system 98 and the braking control system 96. As discussed herein, the controller 14 or the user U can control at least the steering system 80, while tracking the position 134 of the coupler 16 until the vehicle 12 reaches the final endpoint 140, wherein the vehicle hitch ball 26 is aligned with the coupler 16. It is contemplated that the maneuvering of the vehicle 12 may occur manually, semi-autonomously, or autonomously. In semi-autonomous or autonomous examples of the hitch assist system 10, the controller 14 generates commands provided to the vehicle brake control system 96, the powertrain control system 98, and/or the power assist steering system 80 to maneuver the vehicle 12 toward the trailer 18. In semi-autonomous examples, the driver of the vehicle 12 may be required to apply gas and/or apply the brakes while the controller 14 steers the vehicle 12. In yet other examples, the user U may move the vehicle 12 to the desired initial and/or final endpoint 132, 140.

At step 164, the hitch assist system 10 determines whether the hitch assembly 22 is offset in a longitudinal direction and/or a latitudinal direction from the coupler 16. A longitudinal offset is an offset between the hitch assembly 22 and the coupler 16 in a vehicle heading direction, which may be in a vehicle forward and/or a vehicle rearward direction. A latitudinal offset is an offset between the hitch assembly 22 and the coupler 16 in which the current steering angle δ of the vehicle 12 needs to be changed to correct any misalignment issues between the hitch assembly 22 and the coupler 16.

At step 166, the offset between the hitch ball 26 and the coupler 16 is calculated. At step 168, the hitch assist system 10 moves along the alignment path 144 to advance the vehicle 12 towards the final endpoint 140, which may be performed at a speed equal to the second speed-setpoint 150 for at least a portion thereof. During the alignment path 144, the hitch assist system 10 may control the powertrain control system 98 and/or the brake control system 96 to move the vehicle 12 at a speed that is slower than the operational speed of the vehicle 12 during the positioning path 142. In addition, the hitch assist system 10 may compare the actual movement distance during the positioning path 142 with a predicted distance. In response to the comparison, the hitch assist system 10 adapts the brake parameters and prescheduled brake pattern during the alignment path 144 to achieve the desired movement distances.

Once the system determines that a final endpoint 140 has been reached, wherein the coupler 16 may be engaged with the hitch ball 26, at step 170, the hitch assist system 10 may maintain the vehicle 12 in a substantially fixed position since idle torque from the engine or roll from terrain slope would lead to a misalignment with the positioning. The vehicle 12 may be maintained in a substantially fixed position through the application of continuous service brake torque, an automatic shifting over the gear shifter to park, an automatic engagement of a vehicle parking brake, HMI instructions to the user to perform any of the above steps before the service brakes are automatically released, and/or through any other method at which point the operating routine 154 may end at step 172.

Figure 10:
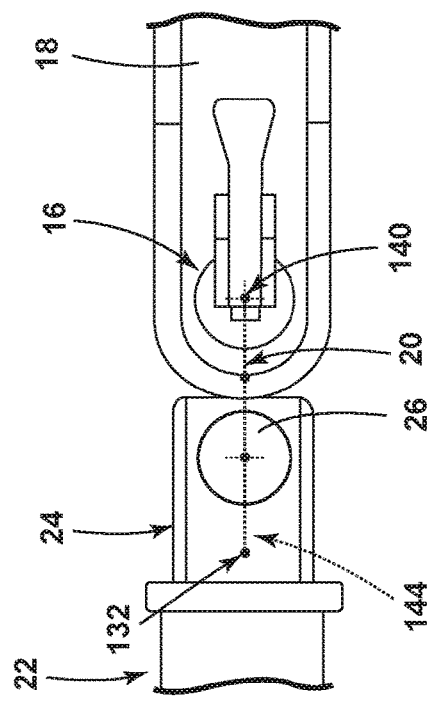
FIG. 10 is an overhead schematic view of the hitch ball offset from the coupler during a step of the alignment sequence with the trailer, according to some examples.
Figure 11:
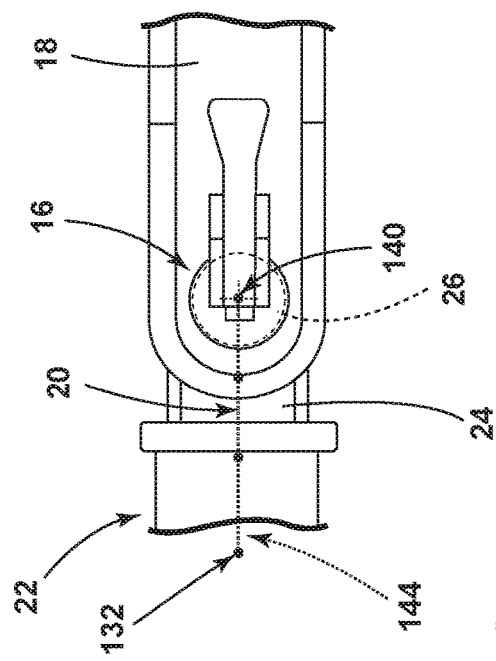
FIG. 11 is an overhead schematic view of the hitch ball offset from the coupler during a subsequent step of the alignment sequence, according to some examples.
Figure 12:
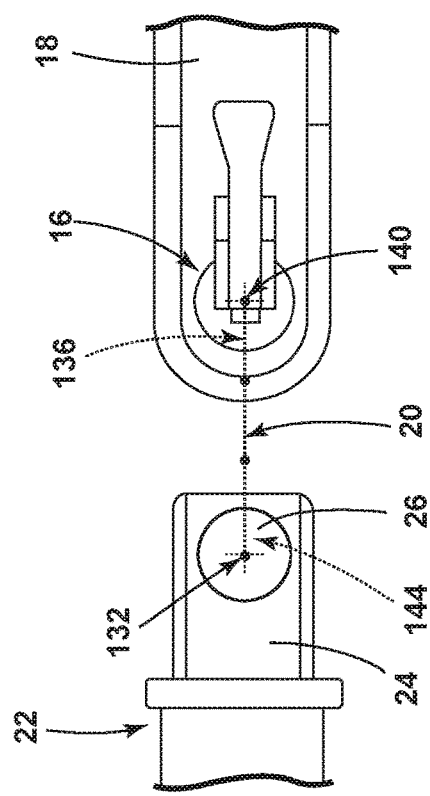
FIG. 12 is an overhead schematic view of the hitch ball during a subsequent step of the alignment sequence with the coupler and showing the hitch ball aligned with the coupler, according to some examples.

Referring to FIGS. 10-12, as provided herein, the vehicle 12 may move along the alignment path 144 at a second speed-setpoint 150. For example, as illustrated in FIG. 10, the vehicle 12 may conclude the positioning path 142 (FIG. 3) at the initial endpoint 132 with the hitch ball 26 longitudinally offset from the coupler 16 and decelerate prior to initiating the alignment path 144. The vehicle 12 may move along the alignment path 144, as illustrated in FIG. 11, at a speed proximate the second speed-setpoint 150 and may recalculate the offset between the hitch ball 26 and the coupler 16 during this time. Based on the updated calculations, the controller 14 may determine whether to keep moving along the same alignment path 144 or to define a new alignment path 144 upon which to move the vehicle 12. The vehicle 12 may then move along the alignment path 144 until the hitch ball 26 and the coupler 16 are positioned in an aligned position, which ends the alignment path 144, and the hitch assist process.

Figure 13:
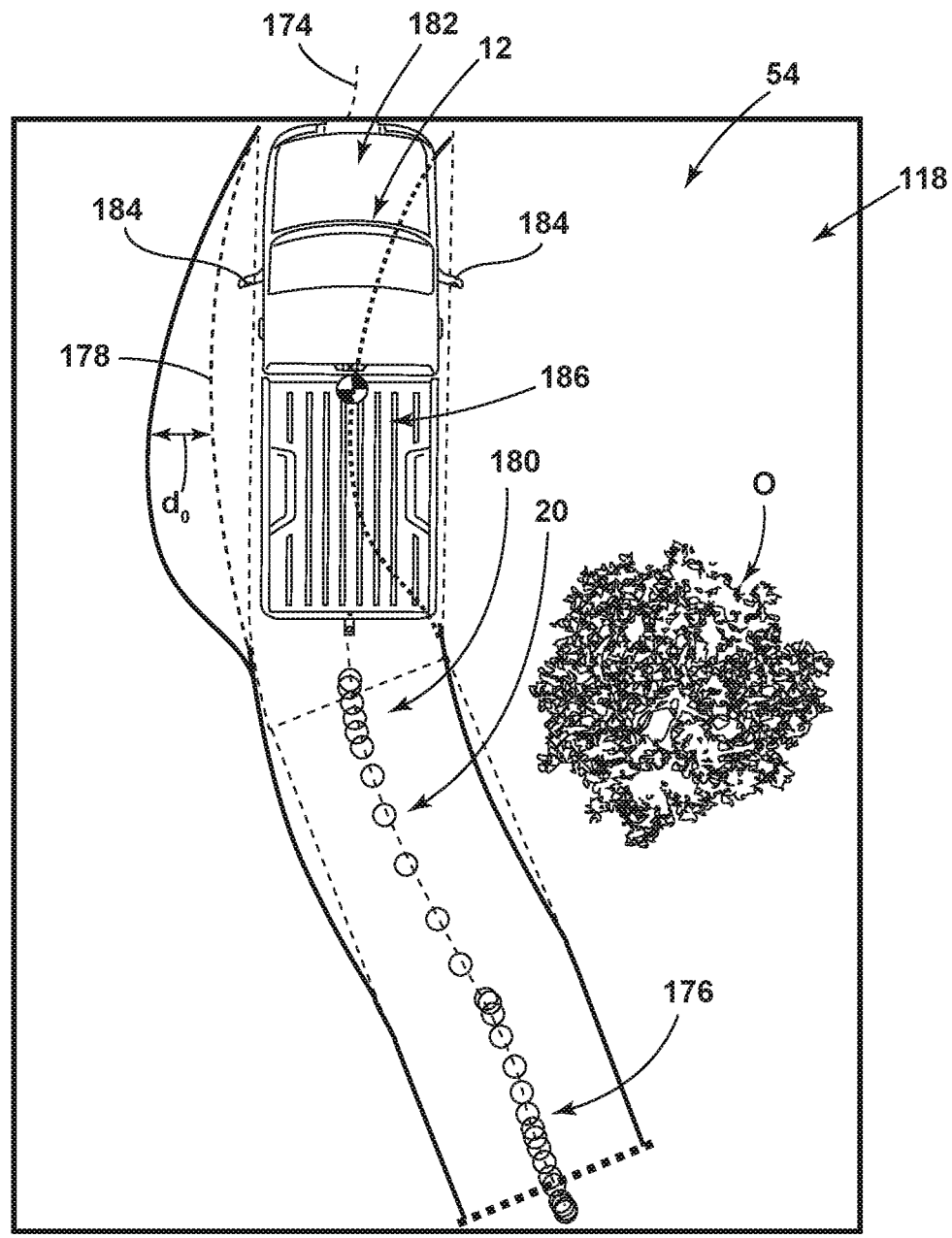
FIG. 13 is an exemplary image on a display, the display illustrating a vehicle occupation zone along the vehicle path, according to some examples.
Figure 14:
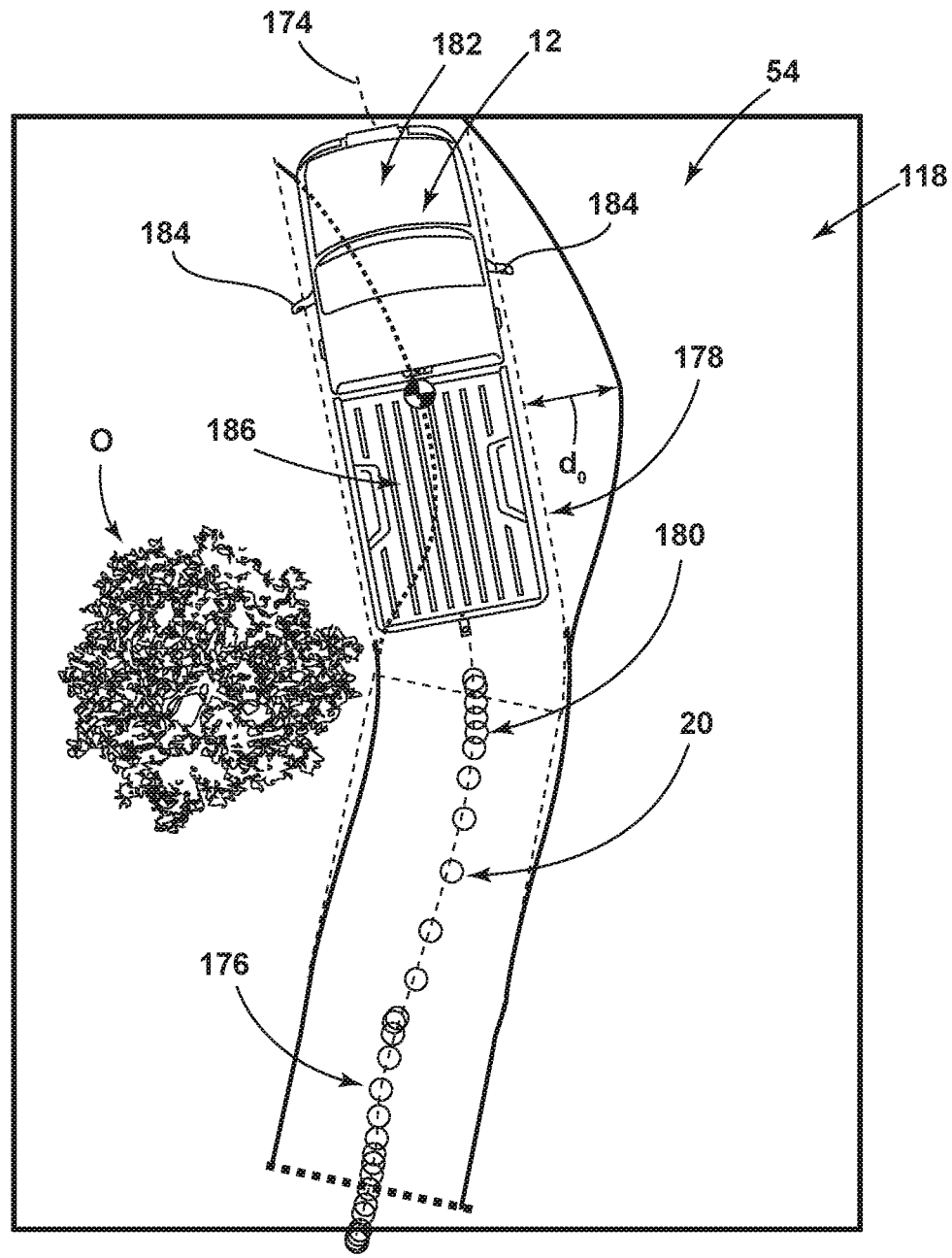
FIG. 14 is an exemplary image on a display, the display illustrating a vehicle occupation zone along the vehicle path, according to some examples.

Referring to FIGS. 13 and 14, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. Based on the commanded path 20, the controller 14 may calculate a vehicle occupation zone 180 based on a longitudinal axis 174 of the vehicle 12 and a wheelbase movement area 176 may extend a vehicle width outwardly from the axis 174 to a path 178 upon which the front and/or rear road wheels 82 rotate upon the ground surface. In some instances, as the vehicle 12 moves along the path 20, portions of the vehicle 12, such as a front portion 182 of the vehicle 12 may extend an additional distance $d_o$ outwardly of the wheelbase movement area 176 creating a potential contact event between the vehicle 12 and an obstacle O proximate the vehicle 12. The additional distance $d_o$ is also disposed within the vehicle occupation zone 180. In some instances, the front portion 182 of the vehicle 12 may be within a vehicle sensing system blind zone when disposed outwardly of the wheelbase movement area 176. The vehicle sensing blind zone may be disposed between a front portion 182 of the vehicle 12 and a side mirror 184 of the vehicle 12, which may be created by a lack of sensors 64, 70 and/or imagers 38, 40, 42, 44 within this area of the vehicle 12. By monitoring obstacles in relation to the vehicle occupation zone 180, the user U and/or the controller 14 may be capable of avoiding obstacles O, even when the obstacle is proximate the blind zone of the vehicle 12.

To mitigate a potential contact event, the hitch assist system 10 may calculate the vehicle occupation zone 180 based on a body trajectory in addition to the path 20 of the vehicle 12. The body trajectory may account for the extension of the body of the vehicle outwardly of the wheelbase when the latitudinal direction of the vehicle 12 is altered. In some instances, the vehicle occupation zone 180 may be shown as an occupation zone overlay 186 on the display 118. Accordingly, the user U may view the projected path 20 of the vehicle 12 and may verify that the vehicle occupation zone 180 is free from obstacles. The occupation zone overlay 186 may also direct the user U to areas of interest around the vehicle 12, such as the area between the front portion 182 of the vehicle 12 and the side mirror 184, where a sensing system blind zone may exist. It will be appreciated that the occupation zone overlay 186 may be updated at any point during the hitch assist operation as new data is inputted into the hitch assist system 10.

Figure 15:
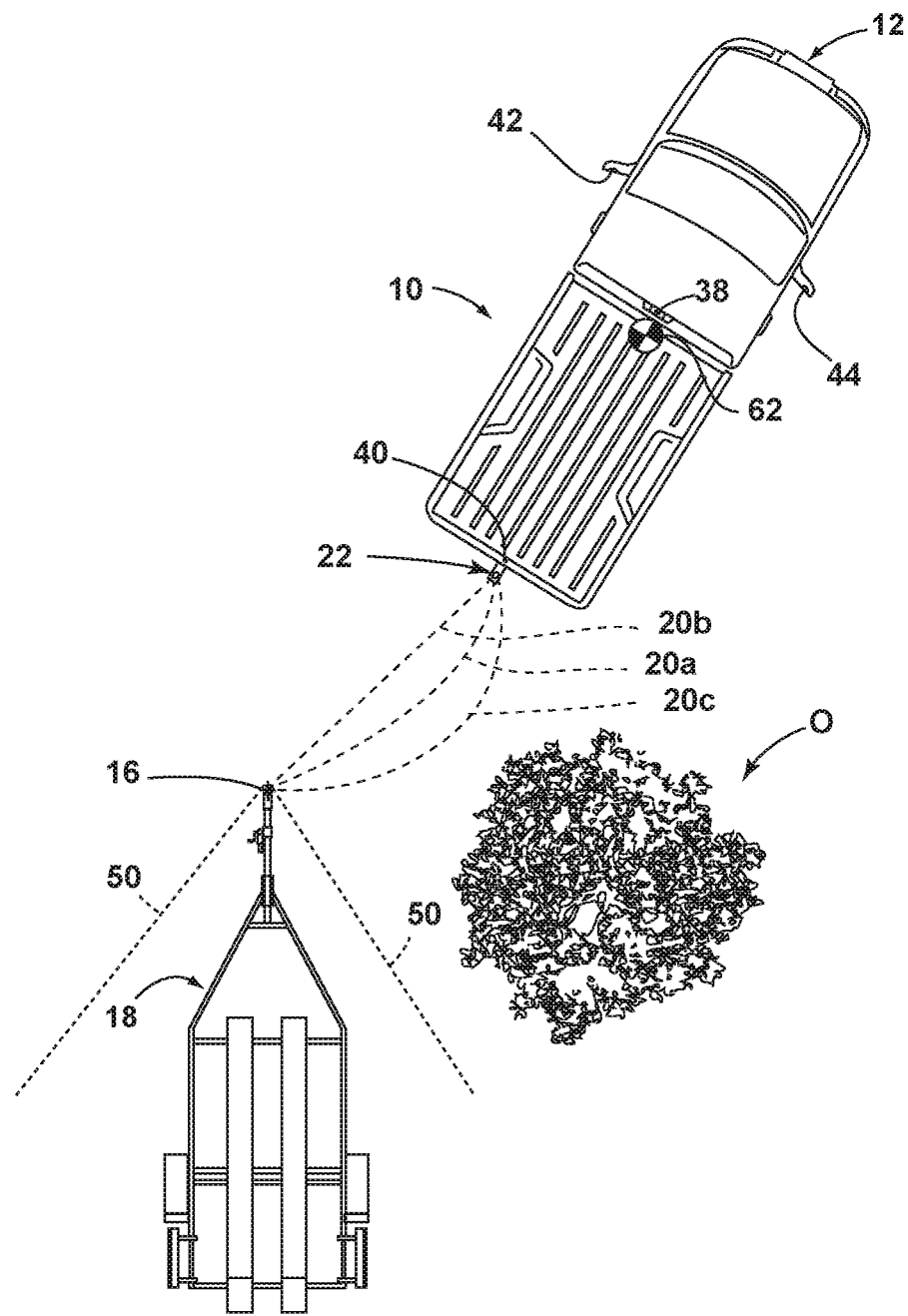
FIG. 15 is an overhead schematic view of the vehicle offset from the trailer and a plurality of possible paths to align the hitch assembly with the coupler, according to some examples.
Figure 16:
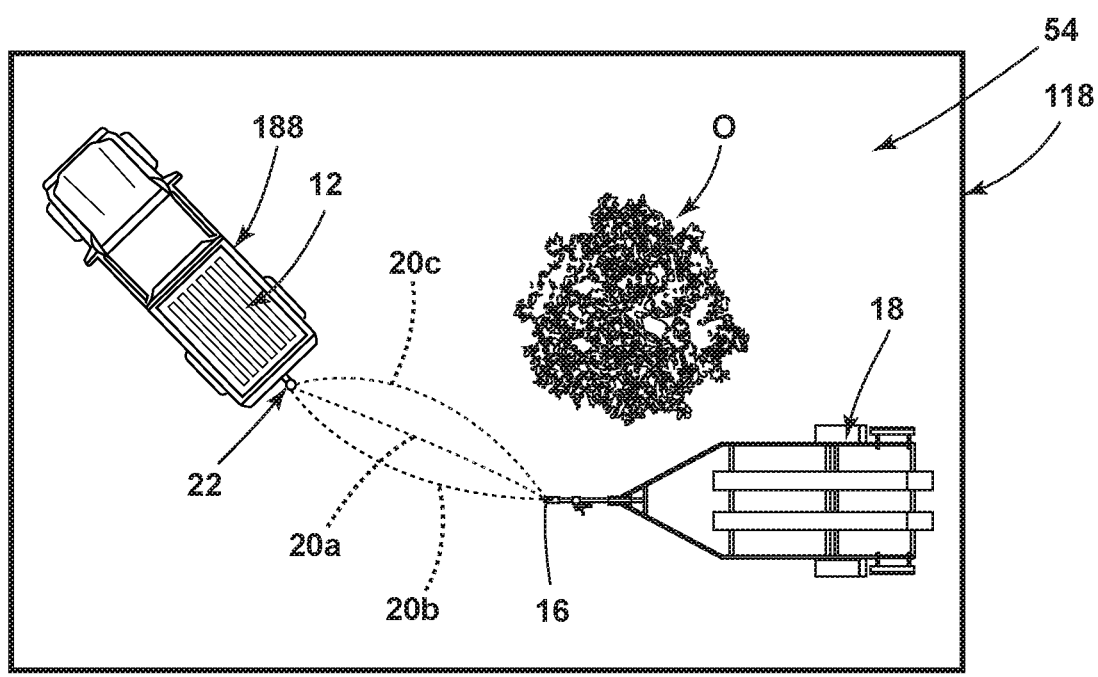
FIG. 16 is an exemplary image on a display illustrating the plurality of possible paths to align the hitch assembly with the coupler, according to some examples.

Referring to FIGS. 15 and 16, in some examples, more than one potential path 20a, 20b, 20c to move the vehicle 12 towards the coupler 16 may be possible. However, some paths 20a, 20b, 20c may be less desirable due to a final orientation between the vehicle 12 and the trailer 18 and/or the vehicle 12 may be disposed near various obstacles while aligning with the hitch assembly 22 with the coupler 16. Accordingly, in some instances, the hitch assist system 10 may include a default path (e.g., 20a) and a plurality of secondary paths (e.g., 20b, 20c). Various factors may be considered when calculating the default and secondary paths 20a, 20b, 20c including, but not limited to, the shortest path, which may be a straight path from the vehicle 12 to the trailer 18, a path where the vehicle 12 and the trailer 18 are longitudinally aligned when the hitch assembly 22 and the coupler 16 are engaged with one another, and/or a path where the front portion 182 of the vehicle 12 is aimed in a similar direction to the direction it was aimed when the hitch assist operation was initiated. In some examples, the various paths 20a, 20b, 20c may be calculated and a path overlay 188 of the various paths 20a, 20b, 20c may be illustrated on the display 118. The user U may select any one of the paths 20a, 20b, 20c on the display 118 and the hitch assist system 10 may direct the vehicle 12 along the chosen path 20a, 20b, 20c. If the driver continues the hitch assist operation without choosing a path 20a, 20b, 20c, the path 20a, 20b, 20c may be automatically selected by the vehicle 12 based on detected obstacles and the desired final orientation between the vehicle 12 and the trailer 18 and/or the default path (e.g., 20a) may be selected.

In some examples, the display 118 may provide the path overlay 188 of the vehicle 12 and the trailer 18 and the driver may have the option to create a path 20 or dictate a vehicle final heading direction on the display 118. For example, the user U may drag their finger along an area between the vehicle 12 and the trailer 18 and a path 20 matching that pattern will be calculated by the hitch assist system 10. Likewise, the user U may dictate a final heading direction of the vehicle 12 by motioning the finger outwardly from the front portion 182 of the vehicle 12.

Figure 17:
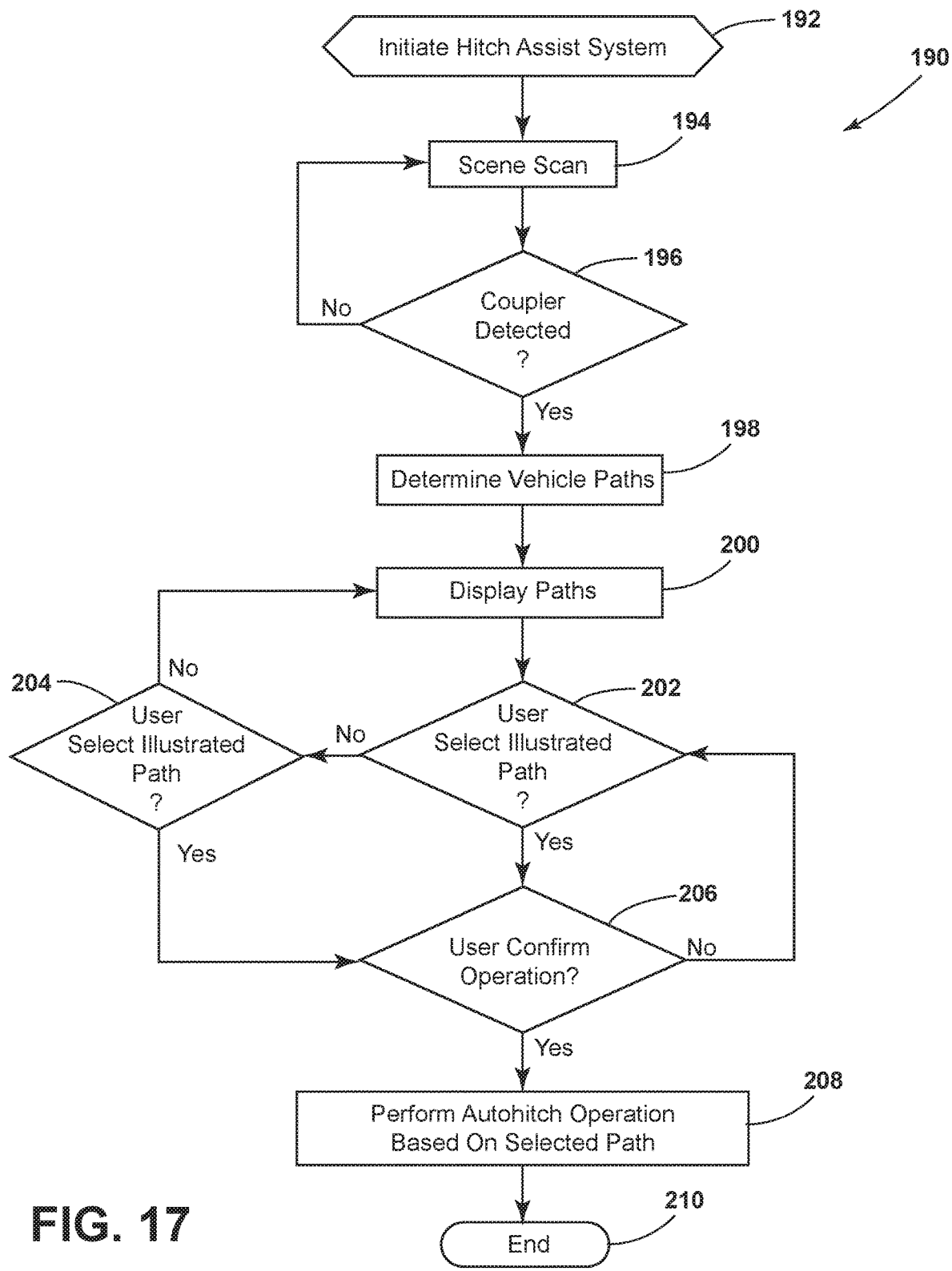
FIG. 17 is a flowchart illustrating the steps of aligning the hitch assembly to the coupler by choosing one of the plurality of possible paths to align the hitch assembly with the coupler, according to some examples.

Referring to FIG. 17, a method 190 of aligning the hitch assembly 22 with the coupler 16 is shown, according to some examples. In particular, in step 192, the hitch assist system 10 is initiated. At step 194, the vehicle 12 scans the scene rearwardly of the vehicle 12 and may determine whether the hitch ball 26 and/or the coupler 16 are within the field of view 48, 50, 52a, 52b of the one or more imagers 38, 40, 42, 44, and/or other sensors 64, 70 within the vehicle sensing system 46. Additionally, once the coupler 16 has been identified, image processing can designate any other objects as obstacles O and can identify the same obstacle within the image data 56 from multiple imagers 38, 40, 42, 44 to determine the positioning and height of the identified obstacles O relative to vehicle 12.

If the coupler 16 has not been identified at step 196, the scene scan can be continued, including while instructing driver to move the vehicle 12 to better align with the trailer 18, until the coupler 16 is identified. When the coupler 16 has been identified, the path derivation routine 128 can be used to determine one or more possible vehicle paths 20a, 20b, 20c (FIG. 16) to align the hitch assembly 22 with the coupler 16 while avoiding any other objects, designated as obstacles O (by default, for example) in step 198. Subsequently, the controller 14 uses the path derivation routine 128 to determine a default path (e.g., 20a) and secondary paths (e.g., 20b, 20c) to align the hitch ball 26 with the coupler 16.

At step 200, the various paths 20a, 20b, 20c are illustrated as a path overlay 188 on the display 118, as exemplarily shown in FIG. 16. The paths 20a, 20b, 20c may be of various colors and/or patterns to further separate the paths from one another. With the various paths 20a, 20b, 20c illustrated on the display 118, the user U may choose the desired vehicle path 20a, 20b, 20c at step 202. The path 20a, 20b, 20c may be chosen through a user interface within the vehicle 12 and/or on the portable device 122. Alternatively, the user U may touch or otherwise choose the desired path 20a, 20b, 20c on the display 118. In some instances, at step 204, if the user U desires a path that is not illustrated, the user U may dictate the desired path on the display 118 and the hitch assist system 10 may calculate a vehicle path 20 to match the desired path. As provided herein, the user may dictate a backing path 20 of the vehicle 12, a heading direction of the vehicle 12, an alignment orientation of the vehicle 12 relative the trailer 18, and/or any other constraint for the hitch assist system 10 to meet while aligning the hitch assembly 22 to the coupler 16.

At step 206, the user U may confirm that the illustrated path 20 on the display 118 is the desired path for aligning the hitch assembly 22 with the coupler 16. After the path 20 has been confirmed by the user U and/or automatically by the hitch assist system 10, at step 206, the hitch assist system 10 can ask the user U to relinquish control of at least the steering wheel 88 of vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation at step 208. When it has been confirmed that user U is not attempting to control steering system 80 (for example, using the torque sensor 94), the controller 14 begins to move vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the velocity of vehicle 12 using the powertrain control system 98 and the braking control system 96. As discussed herein, the controller 14 or the user U can control at least the steering system 80, while tracking the position of the coupler 16 until the hitch assembly 22 is aligned with the coupler 16, at which point the operating routine 130 can end at step 210.

A variety of advantages may be derived from the use of the present disclosure. For example, use of the disclosed hitch assist system provides a sensing system that may continue to monitor the hitch assembly and/or the coupler through independent imagers and/or sensors to monitor the hitch assembly and/or the coupler when out of the field of view of one or more of the imagers and/or sensors. The hitch assist system further includes a controller configured to generate commands for maneuvering the vehicle along a positioning path and a subsequent alignment path, if desired and/or needed. The vehicle may move at a first speed-setpoint during the positioning path and a second speed-setpoint during the alignment path, which may produce a more accurate alignment between the hitch assembly and the coupler. The controller may further generate a vehicle occupation zone that illustrates an area through which the vehicle may move to align the hitch assembly with the coupler. Additionally, the controller may generate multiple paths that may align the hitch assembly with the coupler. A user may select a desired path from the plurality of generated paths, which may assist in avoiding objects proximate the vehicle and/or the trailer.

According to various examples, a hitch assist system is provided herein. The hitch assist system includes a sensing system configured to detect a hitch assembly and a coupler. A controller is configured to generate commands for maneuvering a vehicle along a first path or a second path. A user input device includes a display. The display is configured to illustrate the first and second paths. Examples of the hitch assist system can include any one or a combination of the following features:

the user input device is configured to accept instructions for moving the vehicle along the first path or the second path;
 the display is a touchscreen having circuitry to receive an input corresponding with a location over the display;
 the touchscreen registers one or more touch events thereon for specifying the first path or the second path;
 the sensing system includes a rear imager located on a rear portion of the vehicle and is configured to capture one or more images of a rear-vehicle scene;

the sensing system further includes a side-view imager configured to capture one or more images along a side portion of the vehicle;

the user input device registers one or more touch events thereon for specifying a location of the hitch coupler within a respective field of view from the rear imager or the side-view imager;

the display illustrates an overlay of a vehicle occupation zone of the first path or the second path, the vehicle occupation zone extending outwardly of a wheelbase path of the vehicle;

the vehicle extends outwardly of the wheelbase path of the vehicle as the vehicle deviates from a longitudinal axis; and/or the overlay further includes obstacles within a field of view of the sensing system.

Moreover, a hitch assist method is provided herein. The method includes determining an offset of a hitch ball relative to said coupler. The method also includes calculating a first path to align the hitch ball to said coupler, the first path having a positioning path and an alignment path. The method further includes maneuvering a vehicle a predefined distance along the positioning path at a first vehicle speed-setpoint. Lastly, the method includes aligning the hitch ball to said coupler along the alignment path at a second vehicle speed-setpoint, the second speed-setpoint less than the first vehicle speed-setpoint. Examples of the method can include any one or a combination of the following features:

calculating a second path to align the hitch ball to said coupler; detecting an obstacle proximate the vehicle; and operating the vehicle along the first path or the second path to avoid the obstacle;

displaying the first and second paths on a touchscreen display, the touchscreen display configured to register one or more touch events thereon for specifying a chosen path;

displaying a vehicle occupation zone extending outwardly of a wheelbase on a display;

detecting obstacles proximate the vehicle or said coupler; and illustrating the obstacles in relation to the vehicle occupation zone on the display; and/or the positioning path and the alignment path each include a deceleration period and wherein the alignment path deceleration period is based on a comparison of a detected deceleration period compared to an estimated deceleration period.

According to some examples, a hitch assist system is provided herein. The hitch assist system includes an imager for capturing one or more images of a hitch assembly and a coupler. A display generates an image patch based on the one or more images. A controller is configured to identify the hitch assembly, identify a coupler, and display an overlaid vehicle occupation zone on the display that extends through the hitch assembly, the vehicle occupation zone defining an area in which a vehicle travels to align the hitch assembly with the coupler. Examples of the hitch assist system can include any one or a combination of the following features:

the imager is further configured to detect one or more obstacles proximate the vehicle and the controller is further configured to display the one or more obstacles in relation to the vehicle occupation zone;

the controller generates first and second paths that align the hitch assembly with the coupler; and/or the display is configured as a touchscreen, the touchscreen configured to accept instructions for moving the vehicle along the first path or the second path.

It will be understood by one having ordinary skill in the art that construction of the described invention and other components is not limited to any specific material. Other exemplary examples of the invention disclosed herein may be formed from a wide variety of materials unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially linear" surface is intended to denote a slope that is constant or approximately constant. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system comprising:
a sensing system configured to detect a hitch assembly and a coupler;
a controller configured to generate commands for maneuvering a vehicle along a first path or a second path; and
a user input device including a display, the display configured to illustrate the first and second paths, wherein the controller determines an offset of the hitch ball relative to the coupler, calculates the first path having a positioning path and an alignment path, maneuvers the vehicle in a predefined distance along the positioning path at a first vehicle speed-setpoint, aligns the hitch ball to the coupler along the alignment path at a second vehicle speed-setpoint, wherein the second vehicle speed-setpoint is less than the first vehicle speed-setpoint, calculates the second path to align the hitch ball to the coupler, detects an obstacle proximate the vehicle, and operates the vehicle along the first path or the second path to avoid the obstacle.

2. The hitch assist system of claim 1, wherein the user input device is configured to accept instructions for moving the vehicle along the first path or the second path.

3. The hitch assist system of claim 2, wherein the display is a touchscreen having circuitry to receive an input corresponding with a location over the display.

4. The hitch assist system of claim 3, wherein the touchscreen registers one or more touch events thereon for specifying the first path or the second path.

5. The hitch assist system of claim 1, wherein the sensing system includes a rear imager located on a rear portion of the vehicle and is configured to capture one or more images of a rear-vehicle scene.

6. The hitch assist system of claim 5, wherein the sensing system further includes a side-view imager configured to capture one or more images along a side portion of the vehicle.

7. The hitch assist system of claim 6, wherein the user input device registers one or more touch events thereon for specifying a location of the hitch coupler within a respective field of view from the rear imager or the side-view imager.

8. The hitch assist system of claim 1, wherein the display illustrates an overlay of a vehicle occupation zone of the first path or the second path, the vehicle occupation zone extending outwardly of a wheelbase path of the vehicle.

9. The hitch assist system of claim 8, wherein the overlay further includes obstacles within a field of view of the sensing system.

10. A hitch assist method comprising the steps of:
determining an offset of a hitch ball relative to a coupler;
calculating a first path to align the hitch ball to said coupler, the first path having a positioning path and an alignment path;
maneuvering a vehicle a predefined distance along the positioning path at a first vehicle speed-setpoint;
aligning the hitch ball to said coupler along the alignment path at a second vehicle speed-setpoint, the second speed-setpoint less than the first vehicle speed-setpoint;
calculating a second path to align the hitch ball to said coupler,
detecting an obstacle proximate the vehicle, and
operating the vehicle along the first path or the second path to avoid the obstacle.

11. The hitch assist method of claim 10, further comprising:
displaying the first and second paths on a touchscreen display, the touchscreen display configured to register one or more touch events thereon for specifying a chosen path.

12. The hitch assist method of claim 10, further comprising:
displaying a vehicle occupation zone extending outwardly of a wheelbase on a display.

13. The hitch assist method of claim 12, further comprising:
detecting obstacles proximate the vehicle or said coupler; and
illustrating the obstacles in relation to the vehicle occupation zone on the display.

14. The hitch assist method of claim 10, wherein the positioning path and the alignment path each include a deceleration period and wherein the alignment path deceleration period is based on a comparison of a detected deceleration period compared to an estimated deceleration period.

15. A hitch assist system comprising:
an imager for capturing one or more images of a hitch assembly and a coupler;
a display generating an image patch based on the one or more images; and
a controller for:
identifying the hitch assembly;
identifying a coupler; and
displaying an overlaid vehicle occupation zone on the display that extends through the hitch assembly, the vehicle occupation zone defining an area in which a vehicle travels to align the hitch assembly with the coupler, wherein the controller determines an offset of the hitch ball relative to the coupler, calculates a first path having a positioning path and an alignment path, maneuvers the vehicle in a predefined distance along the positioning path at a first vehicle speed-setpoint, aligns the hitch ball to the coupler along the alignment path at a second vehicle speed-setpoint, wherein the second vehicle speed-setpoint is less than the first vehicle speed-setpoint, calculates the second path to align the hitch ball to the coupler, detects an obstacle proximate the vehicle, and operates the vehicle along the first path or the second path to avoid the obstacle.

16. The hitch assist system of claim 15, wherein the imager is further configured to detect the obstacle proximate the vehicle and the controller is further configured to display the obstacle in relation to the vehicle occupation zone.

17. The hitch assist system of claim 15, wherein the controller generates the first and second paths that align the hitch assembly with the coupler.

18. The hitch assist system of claim 17, wherein the display is configured as a touchscreen, the touchscreen configured to accept instructions for moving the vehicle along the first path or the second path.

* * * * *